United States Patent

[11] 3,573,603

| | | |
|---|---|---|
| [72] | Inventor | Jerker Andersson<br>Ludvika, Sweden |
| [21] | Appl. No. | 847,013 |
| [22] | Filed | Aug. 4, 1969 |
| [45] | Patented | Apr. 6, 1971 |
| [73] | Assignee | Allmanna Svenska Elektriska Aktiebolaget<br>Vasteras, Sweden |
| [32] | Priority | Aug. 29, 1968 |
| [33] | | Sweden |
| [31] | | 11600/68 |

[54] DEVICE IN CURRENT CONVERTERS
4 Claims, 4 Drawing Figs.

[52] U.S. Cl. .................................................. 321/12
[51] Int. Cl. ............................................... H02m 1/18
[50] Field of Search ................................... 321/11, 12, 45 (S)

[56] References Cited
UNITED STATES PATENTS

| | | | |
|---|---|---|---|
| 3,315,146 | 4/1967 | Paice ............................ | 321/45(S) |
| 3,331,990 | 7/1967 | Johansson ..................... | 321/11X |
| 3,458,796 | 7/1969 | Cassady ........................ | 321/45(S) |
| 3,506,907 | 4/1970 | Porterfield .................... | 321/45(S) |

*Primary Examiner*—William M. Shoop, Jr.
*Attorney*—Jennings Bailey, Jr.

ABSTRACT: In a static converter which includes a delay angle control device, a control amplifier for controlling the delay angle control device, and an arrangement for blocking the converter. In order to provide for rapid starting of the converter a limiting member for limiting the delay angle of the converter so as to limit the direct voltage of the converter is controlled by the output signal of the blocking device over a switch delaying circuit. A transient order device is also connected to the input side of the control amplifier to increase the input signal of the amplifier and the transient order device is actuated by the blocking means for the DC transmission line connected to the converter. An under-voltage sensitive device actuated by the voltage in an AC network connected to the converter is connected in parallel to the blocking device, and the two parallel devices are connected to the limiting member and the transient order device by an OR gate.

Patented April 6, 1971  3,573,603

INVENTOR
JERKER ANDERSSON
BY

3,573,603

DEVICE IN CURRENT CONVERTERS

BACKGROUND OF THE INVENTION

1. Field of the Invention

The present invention relates to a means in a static converter for rapid start of the converter, for example after it has been blocked, the converter comprising a control amplifier to control the delay angle control device of the converter and a device to initiate the blocking. Such a blocking device may, for example, be a line protection means for a DC transmission line connected to the converter. The invention relates to a method of rapidly increasing the voltage in the DC transmission line, for example upon reconnection, without the risk of dangerous overvoltages arising in the transmission line, for example if there is an interruption in the line.

2. The Prior Art

Since the control system of the converter must always be provided with a certain damping in order to obtain stable operation, it may be difficult, for example after a line protection operation, because of said damping increase the line voltage sufficiently rapidly. The same problem may arise after a temporary decrease in the voltage in an AC network connected to the converter. The problem of a rapid reconnection after such disturbances arises mainly in high voltage DC power transmissions between two AC networks where, if the power transmission is disconnected for too long, this may cause considerable alterations in one or both AC networks so that the protection means within the AC networks themselves disconnect or block these networks. Even if no disconnection takes place immediately the marginal in the adjustment of such protection means may be so small that the risk of disconnection is impermissibly great. The invention is also of importance for a rapid starting of transmission.

It is therefore important that the converters be reconnected as rapidly possible and an obvious precaution would be simply to give the control system of the converter a temporary (transient) auxiliary signal, thus forcing the voltage in the converter and thus in the DC transmission line rapidly up to full value in spite of the damping. However, there is a risk that the voltage increase would be too rapid and result in over-voltage, particularly if it is the voltage of the rectifier which is forced, and the DC transmission line connected to the rectifier is at the same time disconnected, for example because of a fault in the inverter.

SUMMARY OF THE INVENTION

According to the invention an arrangement is now proposed comprising two members actuated by the signal from said blocking device, the first of said members being a limiting member to limit the delay angle of the converter, corresponding to a limitation of the direct voltage of the converter, said limiting device being controlled by the output signal of the blocking device over a switch-delaying holding circuit. In this way a temporary limitation of the direct voltage of the converter is achieved, and thus also of any possible over-voltage. The second of said members is a transient-order device connected to the input side of the control amplifier to increase the input signal of the amplifier and actuated by the output signal of the blocking device in such a way that the transient-order device is actuated when the blocking signal disappears. Thus, as mentioned above, when the converter is to be reconnected the control system is given a temporary auxiliary order while at the same time the increasing direct voltage of the converter is given a temporary upper limit.

BRIEF DESCRIPTION OF THE DRAWINGS

The invention will be further, described with reference to the accompanying drawings where FIG. 1 shows a converter provided with a means according to the invention, whereas

DESCRIPTION OF THE PREFERRED EMBODIMENT

Figure 1:
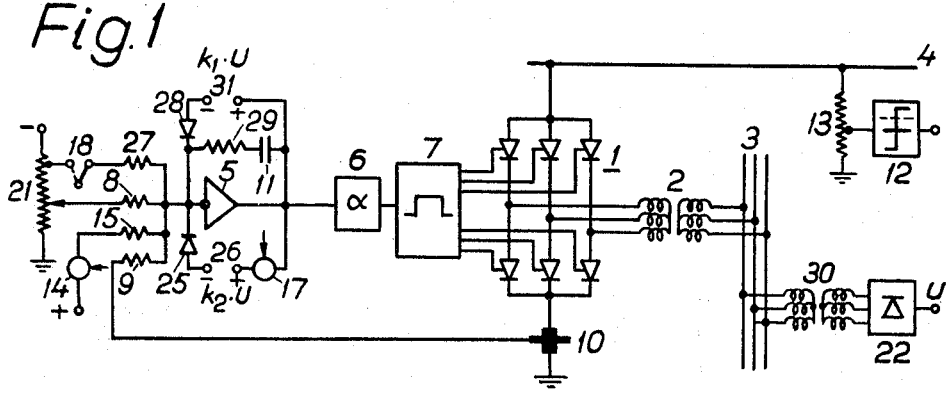

FIG. 1 shows a static converter comprising a rectifier bridge 1 and a converter-transformer 2, over which the converter is connected to an AC network 3. The DC side of the converter is connected between a DC transmission line 4 and earth and in the following it is assumed that the converter is a rectifier feeding an inverter, not shown, over the DC transmission line 4. The converter is provided with a control system comprising a control amplifier 5 which controls a delay angle control device 6 to set the delay angle $\alpha$ of the converter and the delay angle control device 6 controls a control pulse generator 7 which delivers control pulses with the desired delay angle $\alpha$ and curve shape to the rectifiers in the bridge 1.

The amplifier 5 and delay angle control device 6 may cooperate, for example, according to the principle that the maximum output voltage from the amplifier 5 causes the minimum delay angle $\alpha$ in the delay angle control device 6 which in turn causes maximum positive direct voltage in the converter, whereas minimum output voltage from the amplifier 5 gives maximum control angle $\alpha$, that is near 180°, which causes inverter operation and negative voltage in the converter. This principle is shown in FIGS. 1a and b and 6 of copending application Ser. No. 641,180. A certain desired current strength, called the current order, is set on a potentiometer 21 connected to a negative voltage source and the current order is connected to the input side of the control amplifier 5 over a resistor 8. Over a second resistor 9 on the input side of the control amplifier is connected the current response, that is an input magnitude corresponding to the actual current of the converter which is measured with the help of a measuring transducer 10 in the earth connection of the converter. The control amplifier 5 is also provided with a damping feedback which is simply shown here as a capacitor 11 in series with a resistor 29.

Parallel to the feedback circuit is a circuit to set the upper limit of the output voltage of the amplifier 5, said circuit containing a voltage source 31 in series with a diode 28. The voltage source has the magnitude $k_1 \cdot U$ where $U$ is derived from the AC network 3 over a voltage transformer 30 and a rectifier 22. This voltage is so directed in relation to the diode 28, as shown, that the output voltage from the amplifier cannot exceed the voltage $k_1 \cdot U$, thus providing a certain minimum limit for the delay angle $\alpha$.

FIG. 1 also shows a line protection means 12 connected to the DC transmission line 4 over a voltage divider 13. The line protection means may be constructed according to U.S. Pat. No. 3,036,257, that is it is an under-voltage protection means or level protection means which at a certain low line voltage decreases the direct voltage of the rectifier station or blocks the station which may be done with the help of a switching member 14, for example a relay or a transistor, with the help of which a positive direct voltage is connected to the input side of the amplifier over a resistor 15. The input voltage to the control amplifier 5 will thus be positive upon which the input voltage to the delay angle control device 6 decreases towards zero, which for a conventional delay angle control device means that the delay angle $\alpha$ increases towards 180°. This in turn means that the rectifier tends towards inverter operation and its voltage quickly becomes zero. Instead of permitting the line protection means 12 to reduce the output voltage of the control amplifier 5 and thus decreasing the rectifier, it is possible to permit the line protection means to block the rectifier, for example by disconnecting the control pulse generator 7. The expression "blocking" should thus in this connection be taken in its broadest sense that the rectifier station and thus the DC transmission line 4, is made voltageless and currentless in one way or another.

The line protection means 12 is usually designed for temporary blocking of the converter, that is, its output signal disappears after a certain time so that the control amplifier 5 increases the rectifier to normal operation as shown in our U.S. Pat. No. 3,331,990. Because of the damping by the capacitor 11, however, this will take a certain time, which is determined by the time constant in the feedback circuit or, in other words, the time required for recharging the capacitor 11.

In order to reduce this time it is proposed to increase the current order to the amplifier by supplying an auxiliary order to the control amplifier. This may be done, for example, as shown in FIG. 1 where the input of the control amplifier over a switch contact 18 is temporarily connected to a point higher up on the potentiometer 21, see FIG. 2. If, however, the DC transmission line 4 is disconnected, either because of a break in the line itself or because the inverter station at the other end of the line does not come into operation, the voltage from the rectifier will be reflected at the other end of the DC transmission line 4 and an over-voltage will arise which may easily exceed the insulation level of the transmission line. In order to limit this over-voltage a reduced maximum limit is simply introduced for the direct voltage of the converter, which is shown by way of example in FIG. 1 where this is done by introducing a further limitation of the output voltage of the control amplifier 5 with the help of a connection member 17 of the same type as member 14. With the help of member 17 the output side of the control amplifier 5 is connected to the input side over a diode 25 in series with a direct voltage 26 which has opposite direction to the conducting direction of the diode 25 and has the magnitude $k_2 \cdot U$ where $k_2$ is less than $k_1$. In this way the output voltage from the control amplifier 5 can be limited by the direct voltage 26 and by a suitable choice of this direct voltage a limitation of the output voltage of the control amplifier is achieved which gives a higher lower limit for the delay angle $\alpha$ determined by the delay angle control device 6. Since a delay angle $\alpha=0$ corresponds to full operation of the rectifier and thus full direct voltage on this, a lower limit for the delay angle $\alpha$ will cause an upper limit for the direct voltage of the converter and by a suitable choice of the constant $k_2$ and thus the direct voltage 26, it is achieved that the over-voltage possibly arising in the DC line 4 will not exceed the insulation level of the DC transmission line.

Figure 2:
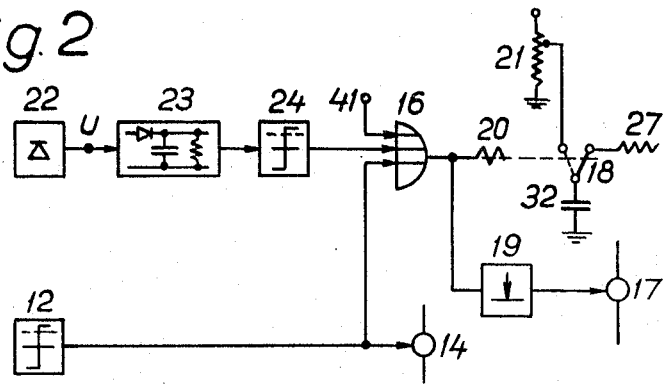
FIG. 2 shows how the components shown in FIG. 1 are connected together according to the invention.

FIG. 2 shows how the members 14, 17 and 18 are controlled by the line protection means 12. An output signal from the line protection means 12 causes the connection means 14 to become conducting so that the converter is blocked as shown in FIG. 1 and when the output signal from the line protection means disappears after a short time the connection member 14 is disconnected and the converter starts operation again.

The signal from the line protection means is transmitted through OR gate OR-gate 16 by means of a switch-delaying holding circuit 19 to the connecting member 17, upon which the above-mentioned extra delay angle limitation is introduced. As long as the connection member 14 is conducting, however, this is of no importance. However, when the signal from the line protection means 12 disappears the connection member 17 will be kept conducting by the switch-delaying holding circuit 19, which may have the same character as the circuit 23 which is described later, that is, 19 contains a capacitor which is rapidly charged but slowly discharged.

The signal from the line protection means is also connected to a relay 20 which controls the switching contact 18 so that a capacitor 32 is charged from a higher point on the potentiometer 21. When the signal from the protection means 12 disappears the relay falls. The charged capacitor 32 is thus connected over the resistor 27 to the control amplifier 5 so that this receives a transient auxiliary order which is explained in connection with FIG. 1. It is thus seen that when the converter is reconnected after a blocking, it will receive a temporary increase of the current order simultaneously with a temporary limitation of its maximum voltage so that a rapid increase of the direct voltage of the container is obtained up to a limited voltage level. Thus the relay 20 and the switching contact 18, together with the capacitor 32, provide the previously mentioned transient-order device.

Another case where a rapid increase of the direct voltage of the converter is desired is when the voltage in the feeding AC network 3 temporarily drops or disappears. This also causes the direct voltage of the converter, and in most cases also the direct current, to disappear temporarily and when the alternating voltage returns on the network 3 it is therefore desirable for the power transmission to be put in operation again as soon as possible. This is done according to the principles described above by permitting the voltage-measuring member 22 connected to the AC network 3 to influence the same member as the line protection means 12, as shown in FIG. 2.

As mentioned, the voltage-measuring member 22 is in the form of a rectifier, the output voltage of which is connected to a filter circuit 23, which has been indicated purely symbolically by a diode, a capacitor and a resistor connected in parallel with the capacitor. Such a filter has a short charging time and slow discharging time which means that temporary voltage drops in the AC network 3 will not affect the system. More permanent voltage drops in the AC network, however, will be sensed by a level circuit 24 which has the nature of an under-voltage protection means substantially as the line protection means 12, which means that when the alternating voltage in the network 3 falls below a certain level the member 24 will deliver an output voltage which is supplied through the OR gate to the members 17—20. This causes the switching member 17 to be activated first so that a delay angle limitation is introduced and when the voltage in the network 3 returns this delay angle limitation by the members 19 and 17 will remain for a short time while at the same time the capacitor 32 is switched in so that a rapid increase of the direct voltage of the converter is obtained to a limited voltage, as mentioned before. It is seen that in principle the members 19 and 23 operate in the same way although the times may be different.

If there is a voltage drop in an AC network connected to the inverter, not shown, the voltage on the transmission line will drop and the control amplifier will decrease the direct voltage of the rectifier station in order to avoid a current surge. When this alternating voltage returns the rectifier station should have its direct voltage increased in the same way as previously. The members 22—24 in FIG. 2 may therefore be duplicated with similar members connected to the AC network of the inverter.

It is also seen that the embodiment according to FIG. 2 also permits the invention to be used for urgent starts of the converter. This may be done either by providing the OR gate 16 with a third input 41 for manual connection of a start-impulse or the circuits 23—24 may be arranged to receive operating voltage before the voltage $U$ is connected, so that the member 24 will activate the members 19 and 20.

A current-controlling rectifier is described above. Similar principles are also valid for a current-controlling inverter, in which case the delay angle $\alpha$ must be controlled upwards, however. Otherwise the situation is substantially analogous in the two cases.

Figure 3:
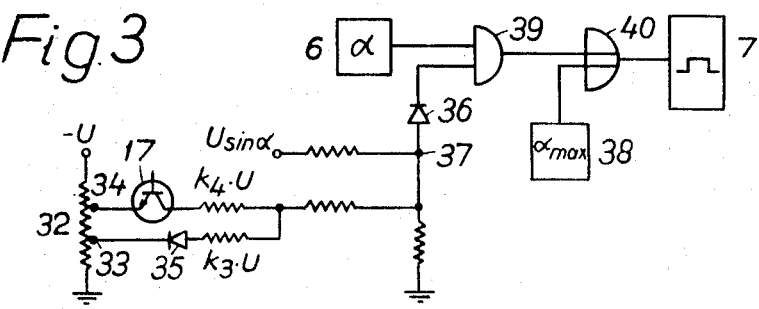
FIG. 3 shows a variation of FIG. 1 and FIG. 4 the voltage curves for this variation.
Figure 4:
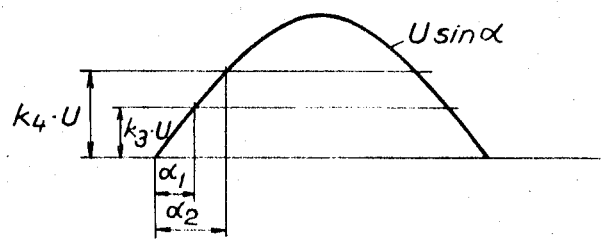

FIGS. 3 and 4 show how a delay angle limitation can be introduced between the delay angle control device 6 and the control pulse generator 7. This is done with the help of an AND gate 39 to which is connected an $\alpha_{min}$ limiter 32—37 and an OR gate 40 to which is connected an $\alpha_{max}$ limiter 38. The invention can thus be used for all types of control systems, for example even that shown in the application Ser. No. 779,368 in which the function of $\alpha_{min}$ and $\alpha_{max}$ limiters is described.

In FIG. 3 the $\alpha_{min}$ limiter comprises a potentiometer 32 provided with two outputs 33 and 34, the first corresponding to normal operation. The output 33 is connected over a diode 35 to the terminal 37 parallel to the commutation voltage $U \sin\alpha$ for the respective rectifier. The terminal 37 is connected over the diode 36 to one input of the AND gate 39 while the delay angle control device 6 is connected to the other input. A signal must be obtained at both these inputs simultaneously in order to obtain a control signal to the control pulse generator 7.

The potentiometer 32 is fed with a voltage $-U$ which is proportional to the amplitude of the commutation voltage and a voltage $-k_3 \cdot U$ is thus obtained at the output 33. The resistors shown form a voltage divider for the voltages $U \sin\alpha$ and $-k_3 \cdot U$ which are illustrated in FIG. 4.

The desire for an $\alpha_{min}$ limit during normal operation is based on the desire for a certain, not too small commutation voltage when the commutation has been initiated in order to get it going quickly. It is thus seen from FIGS. 3 and 4 that when $U \sin\alpha$ exceeds $k_3 \cdot U$ corresponding to the normal $\alpha_{min}=\alpha_1$, the point 37 will be positive and a signal is supplied to 39 over the diode 36. Only then can a control signal from 6 become effective in the control pulse generator 7.

An increase of $\alpha_{min}$ from $\alpha_1$ to $\alpha_2$ corresponding to a commutation voltage $k_4 \cdot U$ is done by connecting the output 34 which is located higher up on 32. This is done by means of the connecting member 17 from FIG. 2 which is shown in FIG. 3 as a transistor. The diode 33 is thus blocked so that $U \sin\alpha$ must now exceed $k_4 \cdot U$ in order for a signal to be emitted over 36 to 39.

It is thus seen that the connection according to FIG. 2 is independent of whether the principle according to FIG. 1 or according to FIG. 3 is used.

I claim:

1. In a static converter, the converter comprising a delay angle control device, a control amplifier to control the delay angle control device and a device for blocking the converter, means for rapid starting of the converter comprising two members actuated by the signal from said blocking device, the first of said members being a limiting member to limit the delay angle of the converter, corresponding to a limitation of the direct voltage of the converter, a switch-delaying holding circuit, said limiting device being controlled by the output signal of the blocking device over said switch-delaying holding circuit, the second member being a transient-order device connected to the input side of the control amplifier to increase the input signal of the amplifier and including means actuated by the output signal of the blocking device to actuate the transient order device when the blocking signal disappears.

2. In a static converter according to claim 1, said blocking device comprising a line-protection means for a DC transmission line connected to the converter.

3. In a static converter according to claim 2, an AC network connected to the converter and, in parallel with said line-protection means, an under-voltage sensitive device which is actuated by the voltage in said AC network and an OR gate connecting said under-voltage sensitive device and the line protection means to said two members.

4. In a static converter according to claim 3, said OR gate being provided with a third input for connection to a starting pulse.